No. 683,027. Patented Sept. 24, 1901.
T. J. EMERSON.
VEHICLE BRAKE.
(Application filed Jan. 28, 1901.)
(No Model.)

Witnesses
T. P. Britt
Clarence Shaw

Inventor
T. J. Emerson,
by
Attorneys

UNITED STATES PATENT OFFICE.

THOMAS J. EMERSON, OF SHULER, ARKANSAS.

VEHICLE-BRAKE.

SPECIFICATION forming part of Letters Patent No. 683,027, dated September 24, 1901.

Application filed January 28, 1901. Serial No. 44,992. (No model.)

*To all whom it may concern:*

Be it known that I, THOMAS J. EMERSON, a citizen of the United States, residing at Shuler, in the county of Union and State of Arkansas, have invented a new and useful Vehicle-Brake, of which the following is a specification.

This invention relates to improvements in vehicle-brakes; and the object is to provide a brake of simple and improved construction in which the operating-lever may be detached from its pivot and lowered, so as not to interfere with the loading or unloading of the vehicle, and also to provide the lever with an improved and simple construction of reinholder.

With the above object in view the invention consists in the novel features of construction hereinafter fully described, particularly pointed out in the claim, and clearly illustrated by the accompanying drawings, in which—

Figure 1:
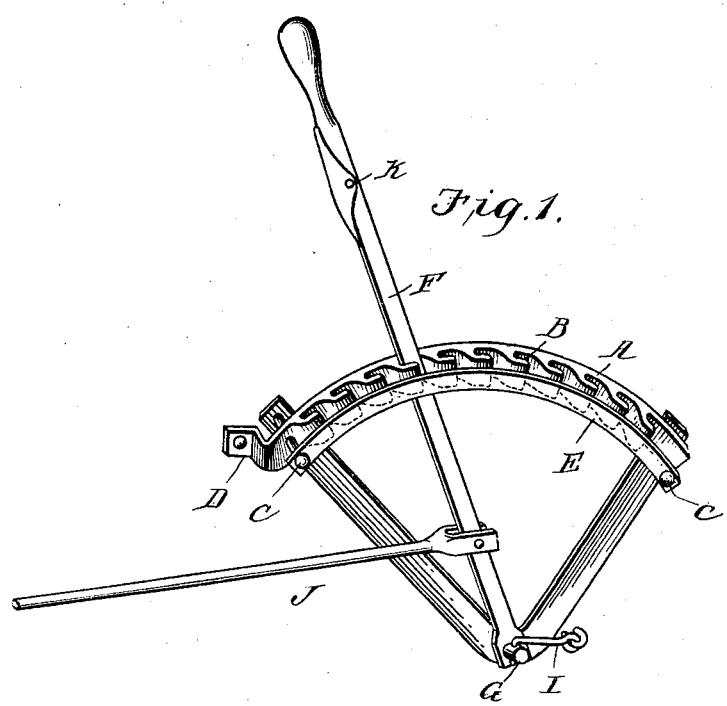
Figure 2:
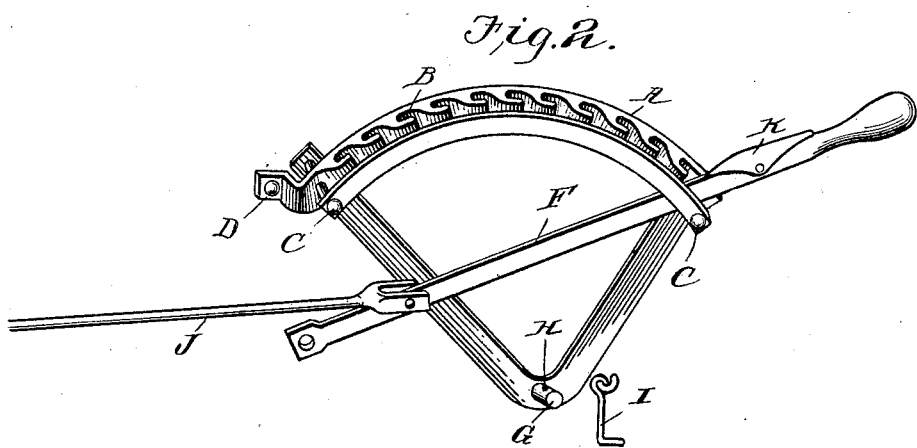
Figure 3:
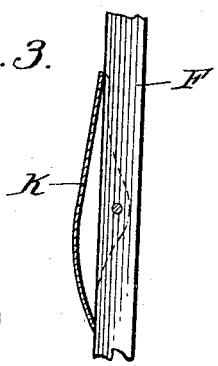

Figure 1 is a perspective view of my improved brake mechanism with the lever in operative position; Fig. 2, a similar view with the lever detached from its pivot and lowered, and Fig. 3 a detail view of the reinholder.

Referring now more particularly to the accompanying drawings, A designates a curved bar provided with the notches or teeth B and attached to and supported a slight distance from the wagon-body by bolts C. One end of said bar is bent inwardly, as illustrated at D, and bolted directly to the wagon-body. Supported on the outer side of bar A and extending parallel therewith is a curved guide-bar E.

F designates the brake-lever, having its lower end perforated to be inserted upon a pivotal bolt G, formed with an eye H. The lever is retained in position upon said bolt and quickly released therefrom by a pivoted hook I, engaging the eye of the bolt. The lever moves between the notched bar and the guide-bar and is moved inwardly into engagement with the notches of the former when it is desired to hold it in its adjusted position. Attached to the lever intermediate its ends is the usual brake-rod J. Secured to the lever adjacent to its handle portion is a concaved metal plate K, having a spring lower end which engages the lever and holds the upper end of the plate also in engagement with the lever. The reins are inserted between the upper portion of this plate and the lever and are tightly held by the former. In loading or unloading the vehicle when the projecting lever is a hindrance to the rapid and convenient carrying out of this operation the hook is disengaged from the pivotal bolt and the lever removed and lowered, so as to be out of the way.

Having thus fully described my invention, what I claim as new, and desire to secure by Letters Patent of the United States, is—

In a vehicle-brake, a pivoted lever having a concaved plate attached intermediate its ends to the lever and having its lower end formed into a spring and holding its upper end in contact with the lever, substantially as described.

THOS. J. EMERSON.

Witnesses:
J. J. WAGNER,
H. C. MCKINNEY.